Oct. 18, 1966  A. J. SORIENTE ETAL  3,279,608
TANK HAVING REPLACEABLE FILTER CARTRIDGES
Filed May 21, 1963  3 Sheets-Sheet 1
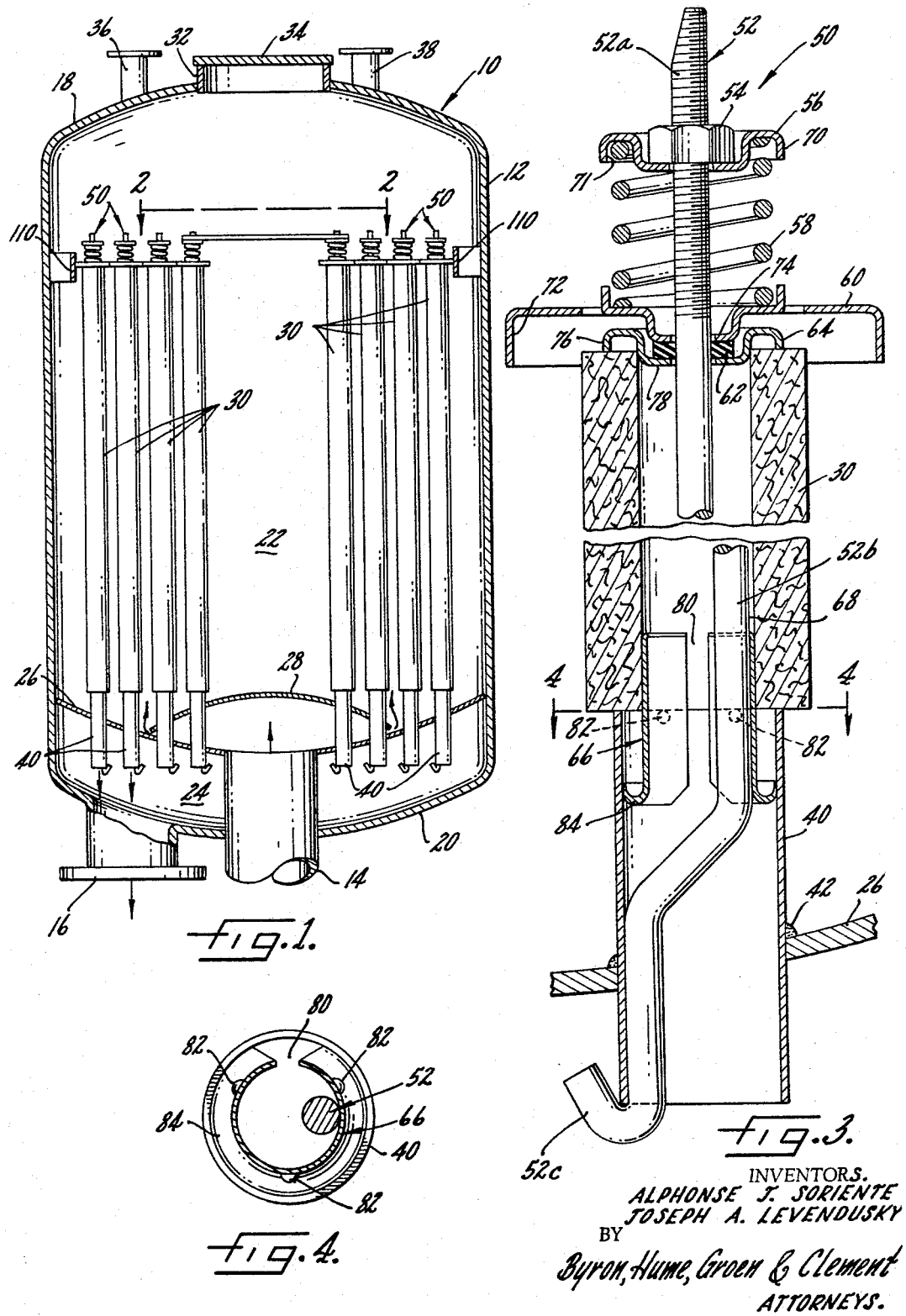
INVENTORS.
ALPHONSE J. SORIENTE
JOSEPH A. LEVENDUSKY
BY
Byron, Hume, Groen & Clement
ATTORNEYS.

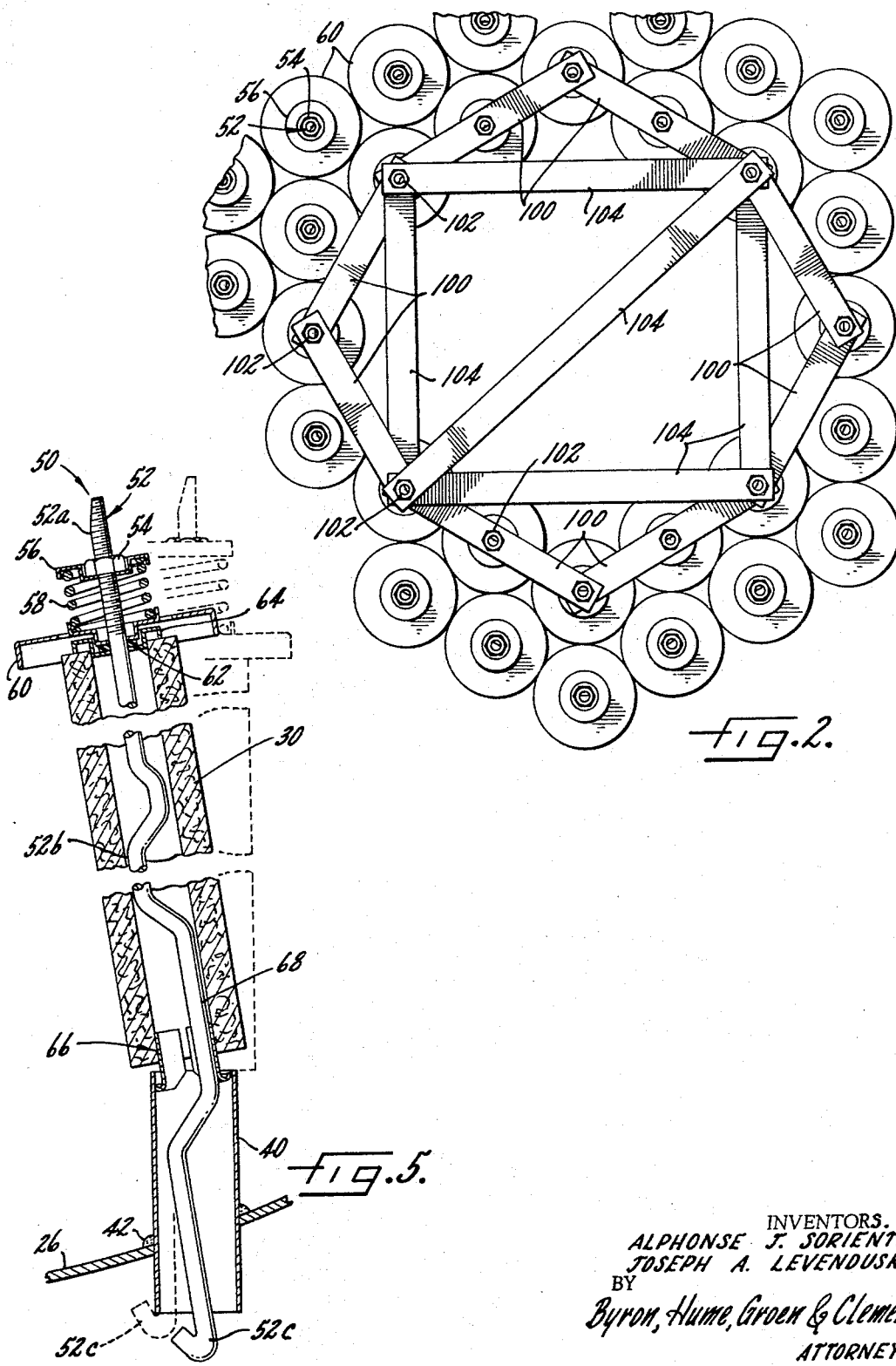

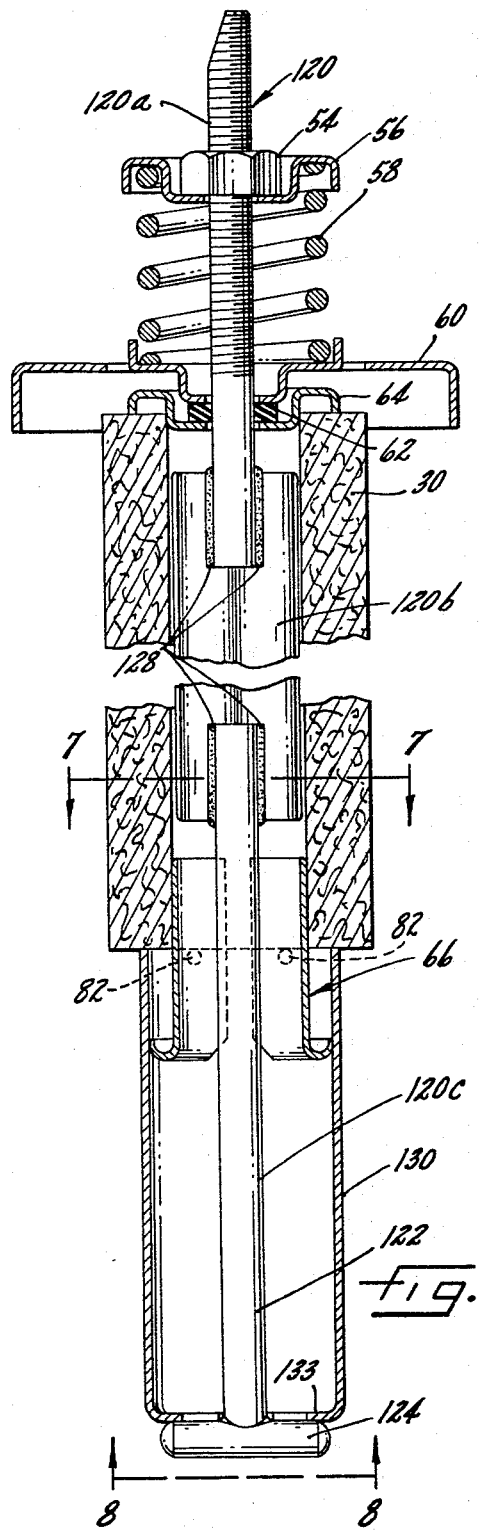
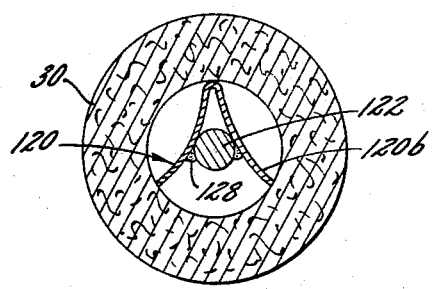
fig.7.
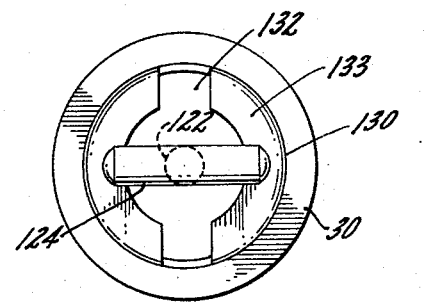
fig.8.
fig.6.
INVENTORS.
ALPHONSE J. SORIENTE
JOSEPH A. LEVENDUSKY
BY
Byron, Hume, Groen & Clement
ATTORNEYS.

United States Patent Office 3,279,608
Patented Oct. 18, 1966

3,279,608
TANK HAVING REPLACEABLE FILTER
CARTRIDGES
Alfonse J. Soriente, Gillette, and Joseph A. Levendusky,
Bayonne, N.J., assignors to Union Tank Car Company,
Chicago, Ill., a corporation of New Jersey
Filed May 21, 1963, Ser. No. 281,888
6 Claims. (Cl. 210—232)

The present invention relates to a filtering device and more particularly to means for holding replaceable filter cartridges and the like in a filter tank.

Filter tanks with replaceable filter cartridges are well known in the art. Heretofore replaceable filter cartridges have been mounted in a filter tank upon stationary standpipes which extend into the filter cartridges. Removing and replacing filter cartridges which have been mounted in this manner necessitates the use of a filter tank which has a head or cover of a size equal to the transverse cross-sectional area of the filter tank or at least as large as the area to be occupied by the filter cartridges. In such instances, the filter cartridge may be removed from and placed into the filter tank after the cover or head has been opened or removed. Another technique, of course, is to make the filter tank oversize so that there is room to remove the filter cartridge from the standpipe within the tank and then take the filter cartridge from the tank through a small manhole or the like.

Filter tanks with large heads or covers are, however, very expensive. Likewise, it is expensive to use oversize filter tanks when they are not otherwise necessary to the processing involved. It is therefore desirable to provide a filtering device including a filter tank, wherein the filter cartridges may be removed from and placed into the filter tank through a small manhole therein, without making the filter tank oversize.

Accordingly, it is an object of the present invention to provide a filtering device including a filter tank whereby a filter cartridge may be placed into and removed from the filter tank through a small opening in the filter tank.

It is another object of the present invention to provide a filter cartridge assembly which may be removed from a filter tank.

It is still another object of the present invention to provide a holding assembly for a filter cartridge, said holding assembly being adapted to allow the filter cartridge to be replaced with another filter cartridge.

It is a further object of the present invention to provide a means for holding a filter cartridge in a filter tank.

It is a still further object of the present invention to provide a means for holding filter cartridges in a filter tank, said means allowing the filter cartridges to be removed from a small opening in the filter tank.

The invention, both as to its organization and method of operation, taken with further objects and advantages thereof, will best be understood by reference to the following description taken in connection with the accompanying drawings, in which:

FIGURE 1 is a partial cross-sectional view of a filtering device embodying the features of the present invention, said filtering device including a plurality of replaceable filter cartridges each having means for holding the filter cartridges in the filtering device in accordance with the present invention;

FIGURE 2 is a partial plan view of the filtering device of FIGURE 1 taken along line 2—2 of FIGURE 1;

FIGURE 3 is an enlarged partial cross-sectional view of a filter cartridge and the means for holding the filter cartridge in the filtering device of FIGURE 1;

FIGURE 4 is a cross-sectional view of the means for holding the filter cartridge in the filtering device of FIGURE 1 taken along line 4—4 of FIGURE 3;

FIGURE 5 is an enlarged partial cross-sectional view of a filter cartridge and the means for holding the filter cartridge in the filtering device of FIGURE 1 as the filter cartridge is being tilted to be removed from the filtering device;

FIGURE 6 is a cross-sectional view of a filter cartridge and a modified means for holding the filtering cartridge in a filtering device in accordance with the present invention;

FIGURE 7 is a cross-sectional view of the filter cartridge and holding means shown in FIGURE 6 taken along line 7—7 of FIGURE 6; and FIGURE 8 is an end view of the filter cartridge and holding means shown in FIGURE 6 taken along line 8—8 in FIGURE 6.

Referring to the drawings, and more particularly to FIGURE 1, a filtering device embodying the features of the present invention is indicated generally by reference numeral 10. The filtering device 10 is adapted to receive an influent stream, filter the influent stream and discharge the filtrate or effluent stream. To these ends the filtering device 10 comprises a filter tank 12 having an inlet or influent line 14 and an outlet or filtrate line 16. The filter tank 12 is a generally cylindrical vessel made of steel or the like having an outwardly convex top 18 and an outwardly convex bottom 20. The tank 12 is divided into an influent zone 22 and a filtrate zone 24 by a downwardly convex tube sheet plate 26 suitably secured to the interior of the tank 12 by welding or the like. The influent line 14 extends through the bottom 20 of the tank 12 and communicates with the influent zone 22 so that all the influent stream is passed directly to the influent zone 22. The influent pipe 14 is attached to the tube sheet plate 26 by welding or the like. In this manner, direct communication between the influent zone 22 and the filtrate zone 24 is precluded.

The influent stream from line 14 is dispersed as it enters the influent zone 22 by a distributor plate 28 having a downwardly concave configuration. The distributor plate 28 is mounted within the influent zone 22 in alignment with the inlet pipe 14 by means not shown in the figures. As the influent stream enters the influent zone 22 it strikes the deflector plate 28 and is distributed radially outwardly of the distributor plate 28. In this manner, the influent stream is distributed substantially uniformly over the influent zone 22.

Mounted within the influent zone 22 are a plurality of filter cartridges 30 through which the influent stream must pass before entering the filtrate zone 24 and being discharged from the filter tank 12 through the outlet line 16. The filter cartridges 30 are annular-shaped filter elements. In this instance, they are nylon-wound filter elements, though other natural and synthetic fibers may be employed as is well known in the art. Each filter cartridge 30 is held in place in the influent zone 22 of the filter tank 12 by a holding assembly embodying the features of the present invention and indicated generally by reference numeral 50. The filter cartridges 30 are placed into and removed from the filter tank 12 through a small manhole opening 32 in the filter tank 12. The manhole opening 32 has a cover means 34 which may be removed or opened, as desired, to provide access to the interior of the filter tank 12.

The filter tank 12 is also provided with a vent 36 and a spare inlet pipe 38, which in this instance is capped. The vent 36 may be of any suitable construction, the selection of appropriate vent means being dependent generally upon the use of the filtering device 10 and being within the ordinary skill of one in the art.

Referring to FIGURES 1–4, the tube sheet plate 26 has attached thereto a cartridge seat means 40 for each filter cartridge 30 in the filter tank 12. The cartridge seat means 40 comprises a small pipe made of steel or the like which extends through a hole in the tube sheet plate 26 and is attached to the tube sheet plate 26 by welding, indicated by reference numeral 42 in FIGURE 3, or other suitable means. The cartridge seat means 40 is substantially parallel to the longitudinal axis of the filter tank 12 and connects the influence zone 22 with the filtrate zone 24. The welding 42 provides a seal between the exterior of the cartridge seat means 40 and the tube sheet plate 26. The cartridge seat means 40 may be press fitted into the tube sheet plate 26, if desired, as the particular technique employed to fasten and seal the cartridge seat means 40 to the tube sheet plate 26 does not constitute a part of the present invention.

The cartridge seat means 40 provides a base for the filter cartridge 30, which is held in position on the cartridge seat means 40 by the holding assembly 50. The holding assembly 50 includes a fastening means 52, a spring cap means 56, a spring means 58, a spacer means 60, a sealing means 62, a clamping means 64, and a positioning means 66. The fastening means 52 is adapted to detachably engage the cartridge seat means 40 and comprises an elongated rod member having end portions 52a and 52c and an intermediate portion 52b. The end portion 52c is adapted to releasably engage the cartridge seat means 40 and to these ends it is shaped to form a hook. The fastening means 52 extends through the interior of the filter cartridge 30. The intermediate portion 52b of the fastening means 52 has a sinuous planar configuration comprising a plurality of flattened peaks 68 which extend outwardly into contact with or in close proximity to the interior of the filter cartridge 30 as shown in FIGURES 3 and 5. The shape of the intermediate portion 52b limits the lateral movement of the filter cartridge 30 and assists in maintaining the filter cartridge 30 on the cartridge seat means 40 when it has been placed into the filter tank 12.

The end portion 52a of the fastening means 52 is threaded and receives a nut 54 or other suitable means to hold the spring cap means 56, the spring means 58, the spacer means 60, the sealing means 62 and the clamping means 64 in proper position. The spring means 58 is a compression spring which acts upon the spacer means 60, the sealing means 62 and the clamping means 64 in one direction and the spring cap means 56 in the other direction so that the filter cartridge 30 is held on the tube seat means 40.

The spring cap means 56 comprises an annular plate with a central opening through which the threaded end portion 52a of the fastening means 52 extends. There is sufficient clearance between the central opening of the spring cap means 56 and the threaded end portion 52a so that the spring cap means 56 may be placed over the end portion 52a of the fastening means 52. An annular groove 71 formed by an annular U-shaped flange 70, is adapted to receive one end of the spring means 58. The other end of the spring means 58 rests upon the spacer plate means 60 and forces it toward the filter cartridge 30.

The spacer means 60 assists in maintaining the filter cartridges 30 a predetermined distance from one another and holds the sealing means 62 in proper position to prevent influent from by-passing the filter cartridge 30. To these ends the spacer means 60 is an annular-shaped plate made of steel or the like having a central opening so that it may be placed over the fastening means 52. The spacer means 60 has a downwardly extending annular hub portion 74 which contacts the sealing means 62 and, by virtue of the force exerted by the spring means 58, causes the sealing means 62 to prevent leakage of influent between the fastening means 50, the spacer means 60 and the clamping means 64. The spacer means 60 has a perpendicularly depending, annular flange 72 which cooperates with the flanges 72 of the spacer means 60 of the adjacent holding assemblies 50 to maintain the filter cartridges 30 at a predetermined distance from one another.

The clamping means 64 is adapted to grip one end of the filter cartridge 30 and to these ends comprises an annular plate made of steel or the like having a central hole so that it may be placed over the fastening means 50. The clamping means 64 has a central hub portion 78 which extends into the end of the filter cartridge 30. The outside diameter of the hub portion 78 is substantially equal to or slightly less than the internal diameter of the filter cartridge 30 in order to limit lateral movement of the filter cartridge 30. A perpendicularly depending annular flange 76 engages and grips the end of the filter cartridge 30. In this manner, the clamping means 64 holds one end of the filter cartridge 30 and, through the force of the spring means 58, prevents the filter cartridge 30 from lifting off of the cartridge seat means 40. Furthermore, the clamping means 64 prevents influent from passing between the clamping means 64 and the filter cartridge 30.

The sealing means 62, which is a rubber or plastic gasket, O-ring or the like, is provided between the spacer means 60 and the clamping means 64. The sealing means 62 rests in the hub portion 78 of the clamping means 64 which is large enough to receive the hub 74 of the spacer means 60. The spring means 58 exerts sufficient force to cause the spacer means 60 to press the sealing means 62 against the clamping means 64 so that influent cannot pass around the sealing means 62 between the spacer means 60 and the clamping means 64. In addition, the sealing means 62 is compressed sufficiently to seal around the fastening means 52. In this manner, influent will not pass into the interior of the filter cartridge 30 without passing through the filter cartridge 30.

The positioning means 66 is a tubular member press-fitted into the end of the filter cartridge 30 resting upon the cartridge seat means 40 and prevents lateral movement of this end of the filter cartridge 30. The positioning means 66 has a longitudinal slot 80 extending its entire length. In its free state, the outside diameter of the positioning means 66 is slightly larger than the inside diameter of the filter cartridge 30. To insert the positioning means 66 into the end of the filter cartridge 30, the positioning means 66 is compressed by hand to reduce its diameter and partially inserted into the end of the filter cartridge 30. Upon releasing the positioning means 66, it will spread out and grip the interior of the filter cartridge 30. The exterior of the positioning means 66 has a plurality of knobs or projections 82 which abut the filter cartridge 30, position the positioning means 66 and prevent total insertion of the positioning means 66 into the filter cartridge 30.

The end of the positioning means 66 extending outwardly from the filter cartridge 30 has an annular flared flange portion 84 having a generally U-shaped cross-section. The flange portion 84 extends into the cartridge seat means 40 and has an outer diameter substantially equal to the inside diameter of the cartridge seat means 40. Thus the flange portion 84 slidingly engages the interior surface of the cartridge seat means 40 and prevents lateral movement of this end of the filter cartridge 30 when the positioning means 66 has been aligned within the cartridge seat means 40.

To install a filter cartridge 30, a positioning means 66 is inserted into one end of the filter cartridge 30. The filter cartridge 30 is placed over the fastening means 52. The clamping means 64, the sealing means 62, the spacer means 60, the spring means 58 and the spring cap means 56 are then placed over the fastening means 52, in that order. The nut 54 is then threaded onto the threaded end portion 52a to hold these various elements on the fastening means 52.

The cartridge assembly, which comprises the holding assembly 50 and the filter cartridge 30, is then inserted into the tank 12 through the manhole 32. As shown in FIGURE 5, the end portion 52c of the fastening means 52 is inserted into the cartridge seat means 40 with the cartridge assembly in a tilted position. The spring means 58 is compressed by pressing on the nut 54, the spring cap means 56 or the end portion 52a of the fastening means 52 so that the hook end portion 52c will extend below the lower end of the cartridge seat means 40. The cartridge assembly is then moved from its tilted position to a substantially vertical position, as shown in dotted lines in FIGURE 5, and the pressure on the spring means 58 released so that the hook portion 52c engages the cartridge seat means 40. The force of the spring means 58 will force the filter cartridge 30 to seat upon the cartridge seat means 40. The cartridge assembly is now in proper position. Additional cartridge assemblies are installed in the filter tank 12 in the same manner, the installation of the cartridge assemblies proceeding from the outside of the tank inwardly.

The cartridge seat means 40 are positioned in the tube sheet plate 26 so that the spacer means 60 of adjacent cartridge assemblies abut one another to prevent lateral movement or swaying of the filter cartridges 30. To further stabilize the filter cartridge 30 in the filter tank 12, the innermost cartridge assemblies are secured to adjacent or other cartridge assemblies by a plurality of retaining bars 100, as shown in FIGURE 2. Each retaining bar 100 has two or more holes therein adapted to receive the threaded end portion 52a of the fastening means 52 of the particular cartridge assemblies to be attached to one another. Nuts 102 threadedly engaging the end portion 52a secure the retaining bars 100 to the cartridge assemblies. Suitable bracing bars 104, which are the same as the retaining bars 100, are provided which extend transversely and diagonally across the interior of the tank 12 to provide additional rigidity for the innermost cartridge assemblies and therefore stabilize all the other cartridge assemblies. The bracing bars 104 are secured to various cartridge assemblies with nuts 102 also. As seen in FIGURE 1, the filter tank 12 is provided with a suitably supported annular ridge member 110 which is contacted by the spacer means 60 of the outermost cartridge assemblies. These outermost cartridge assemblies may contact the filter tank 12 if it is desired that they be very close to the filter tank 12.

The cartridge assemblies are removed from the tank 12 by removing the retaining bars 100 and the bracing bars 104 and then removing the individual cartridge assemblies. The procedure for removing the cartridge assemblies is the reverse of the procedure by which they are installed in the filter tank 12 as described hereinbefore. In accordance with the present invention therefore the filter cartridges 30 may be replaced without the tank 12 having a large head or cover since the cartridge assemblies need not come straight out of the tank 12.

Referring to FIGURES 6–8 there is illustrated a modified holding assembly embodying the features of the present invention. Like referencee numerals have been employed in these figures where the elements are the same as those in the holding assembly 50, discussed hereinbefore with respect to FIGURES 1–5. The modified holding assembly differs from the holding assembly 50 in that a different fastening means, indicated generally by reference numeral 120, is utilized, which cooperates with a modified cartridge seat means, indicated generally by reference numeral 130. The fastening means 120 comprises end sections 120a and 120c and an intermediate section 120b. The end section 120a is a threaded rod member while the end section 120c comprises two rod members 122 and 124. The member 124 is welded or otherwise suitably secured to the member 122 so as to be substantially perpendicular to the member 122. The intermediate section 120b comprises a longitudinally extending V-shaped member, made of steel or the like, which fits snugly into the interior of the filter cartridge 30. The V-shaped member has two leg portions forming an apex and having free ends, the apex and free ends being in close proximity to the interior of the filter cartridge 30 to prevent lateral movement thereof. The threaded portion 120a and the member 122 of the end portion 120c are suitably secured by welding 128 or the like to the interior of the V-shaped intermediate section 120b.

The cartridge seat means 130 is a tubular member which is secured to the tube sheet plate 26 in the same manner as the cartridge seat means 40. The cartridge seat means 130 has an end member 133 having a transversely extending slot 132 through which the member 124 may pass. Once the member 124 is disaligned with the slot 132, as by rotation of the fastening means 120, the cartridge assembly is locked in place.

The installation of the holding assembly 120 is substantially the same as the installation of the holding assembly 50, except that the cartridge assembly need not be tilted to attach it to the cartridge seat means 130. The holding assembly 120 is removed by rotating the fastening means 120 until the member 124 is aligned with the slot 132 whereby the cartridge assembly will be released and may be removed from the filter tank 12 through the manhole 32.

When the embodiments described herein are at present considered to be preferred, it will be understood that various modifications and improvements may be made therein and it is intended to cover in the appended claims all such modifications and improvements as fall within the true spirit and scope of the invention.

What is claimed is:

1. In a filter tank having first and second end portions, said filter tank having a small opening in said first end portion, plate means mounted in said tank in said second end portion, means for holding an annular filter cartridge in a filter tank comprising an annular cartridge seat means having first and second ends, said seat means being supported in said tank by said plate means with said second end being spaced from said plate means, said filter cartridge having first and second ends, said first end of said filter cartridge resting upon said first end of said cartridge seat means and said second end of said filter cartridge extending toward said first end portion of said tank, and a fastening means extending through said filter cartridge and having a first end with means to hook onto the second end of said cartridge seat means and a second end having spring-biased means for gripping said second end of said filter cartridge.

2. The means for holding an annular filter cartridge of claim 1 wherein said second means for gripping said second end of said filter cartridge comprises a clamping means, a cap means and a spring means, said clamping means gripping said second end of said filter cartridge, said spring means being positioned between said cap means and said clamping means.

3. The means for holding an annular filter cartridge of claim 2 including a spacer means and a sealing means about the fastening means between said spacer means and said clamping means, said spring means being positioned between said cap means and said spacer means, said spring means compressing said sealing means to prevent fluid leakage between said fastening means and said sealing means.

4. The means for holding a filter cartridge of claim 1 wherein said fastening means has an intermediate portion between its ends comprising a sinuous planar member having peaks which are in close proximity to an interior surface of said filter cartridge.

5. The means for holding a filter cartridge of claim 1 including a positioning means adapted to be inserted into said first end of said filter cartridge, said positioning means extending into said cartridge seat means and preventing lateral movement of said first end of said filter cartridge.

6. The means for holding a filter cartridge of claim 1 wherein said fastening means has an intermediate portion between its ends, comprising a V-shaped member having two legs which are connected to one another to form an apex, said two legs having free ends, said apex and said free ends being in close proximity to an interior surface of said filter cartridge.

References Cited by the Examiner
UNITED STATES PATENTS

| | | | |
|---|---|---|---|
| 2,354,380 | 7/1944 | Kasten | 210—488 |
| 2,543,481 | 2/1949 | Wicks et al. | 210—452 X |
| 2,709,525 | 9/1950 | Beyer et al. | 210—232 |
| 2,872,044 | 2/1959 | Kasten | 210—323 |
| 2,889,933 | 6/1959 | Brundage | 210—323 |
| 2,921,686 | 1/1960 | Forman et al. | 210—323 |

FOREIGN PATENTS

| | | |
|---|---|---|
| 212,999 | 2/1958 | Australia. |
| 855,068 | 11/1960 | Great Britain. |

REUBEN FRIEDMAN, *Primary Examiner.*

SAMIH N. ZAHARNA, *Examiner.*

C. DITLOW, *Assistant Examiner.*